Feb. 4, 1930.   A. G. KINYON   1,746,041
CONVEYING APPARATUS
Original Filed July 25, 1925
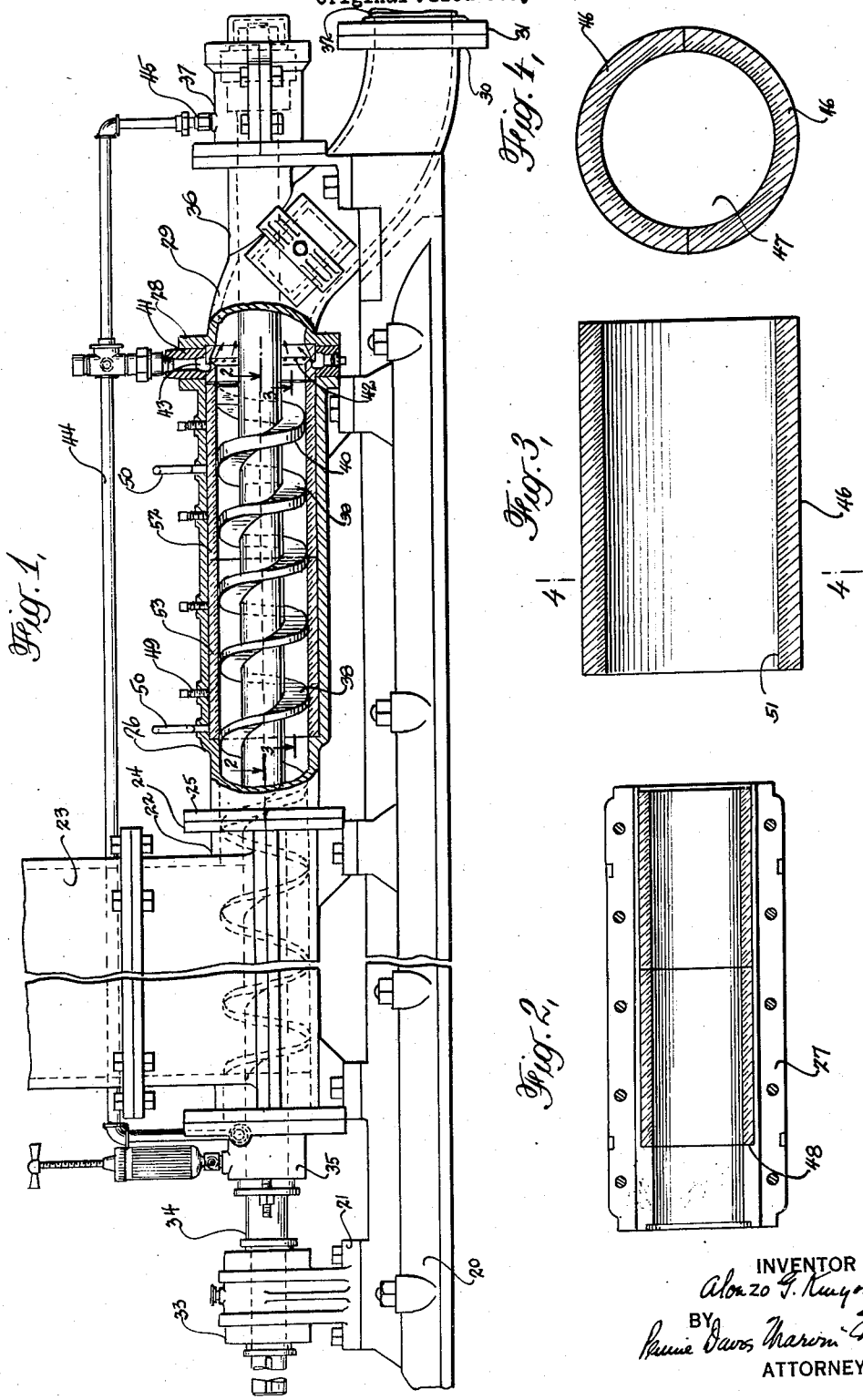
INVENTOR
Alonzo G. Kinyon
BY
Pennie Davis Marvin Edmonds
ATTORNEYS Patented Feb. 4, 1930

1,746,041

UNITED STATES PATENT OFFICE

ALONZO G. KINYON, OF ALLENTOWN, PENNSYLVANIA, ASSIGNOR TO THE ESTATE OF JAMES W. FULLER, DECEASED, OF CATASAUQUA, PENNSYLVANIA

CONVEYING APPARATUS

Original application filed July 25, 1925, Serial No. 45,966. Divided and this application filed October 11, 1926. Serial No. 140,729.

This invention relates to apparatus for the conveying of materials in a finely divided condition or substances which, in their natural state, are in the form of finely divided particles. Examples of such materials are pulverized fuel, raw and finished cement, soda ash, talcum powder, starch, and the like.

This invention is particularly directed to certain improvements in the apparatus illustrated and described in my Patent No. 1,553,539, issued September 15, 1925, the application for which was copending with my application, Ser. No. 45,966, filed July 25, 1925, of which the present application is a division. In that apparatus, the principle of conveying by mechanical pressure and aeration is utilized and the material is propelled through a transport line by the continuous application of pressure upon a column of material filling the line, the material having been rendered fluent by the injection of a gas so that the pressure is effective to produce the desired result.

In the apparatus of the patent, the material to be conveyed is continuously fed into a casing connected to the line and within the casing is a shaft provided with a worm or screw by which the material is propelled from the casing into and through the line. The screw is preferably made with a varying pitch or the casing is made with a decreasing diameter toward its discharge end so that the material will be pressed together or compacted near its point of discharge into the line. Immediately prior to its entrance into the line, the material is aerated or rendered fluent by the injection of a gas under pressure, the amount of the gas so injected being entirely insufficient to act as a vehicle for the material but merely entering the interstices in the mass and increasing the freedom with which it may be moved.

Practical use of the patented apparatus has shown that it is thoroughly satisfactory for all ordinary materials, but when used with materials of a highly abrasive character, such as Portland cement, certain parts of the device are subject to wear. In particular, the flights of the screw at the discharge end of the casing and the interior of the casing at this point are subjected to the greatest abrading action and may require replacement after a time. Accordingly, the present invention is directed to the provision of an apparatus of the type referred to which is an improvement over that originally disclosed, due to the use of a screw of modified construction particularly adapted to withstand wear, and of a casing in which the screw operates which is provided with liner members having great wear resisting qualities and arranged for ready replacement and rearrangement, so that they may be used for long periods and then, when necessary, replaced without difficulty.

In the improved apparatus, the conveyor casing is made of curved sections having end and side flanges which may be assembled and secured together by their flanges to produce a casing of cylindrical form. Extending lengthwise through this casing is a shaft having flights which form a conveyor screw. This screw is of decreasing pitch as it approaches the discharge end of the casing so that the material is gradually compressed as it advances. The screw is made up of sections secured together to form a continuous screw and toward the discharge end where the greatest abrading action takes place the flights are made of gradually increasing thickness to give added strength and resistance to wear.

The casing used in the improved apparatus has a wear face provided by the use of liner members of arcuate shape. These liners have a length less than the casing, so that the lining therefor is made up of two or more sections, each of which includes two or more liner members. The members are made of metal which is very hard and resistant to wear, or they may have their faces given a special hardening treatment, or covered with a layer of hard resistant metal welded or otherwise secured to the main body of the liner. As the greatest wear occurs near the discharge end of the screw, the liners at this end of the casing wear most rapidly, but as all the liners are of similar construction and interchangeable, and as each liner is symmetrical, the liners as they become worn may be rearranged, by turning them end for end, or the liner sections may be interchanged. The manner in which the casing and liners are constructed makes this a simple operation and when replacement is required, this may be done without putting the apparatus out of action for an extended period.

For a better understanding of the invention, reference may be made to the accompanying drawing, in which Fig. 1 is a view in side elevation and partly in section, showing the new apparatus, Fig. 2 is a sectional view on the line 2—2 of Fig. 1, Fig. 3 is a longitudinal sectional view of one of the liner members on the line 3—3 of Fig. 1, and Fig. 4 is a transverse sectional view through a pair of liners on the line 4—4 of Fig. 3.

In the drawing the illustrated apparatus comprises a base 20 of any rigid construction secured to one end of which is a pillow block 21. Mounted on the base at a distance from this pillow block is a section 22 of the conveying device which has a hopper 23 into which the material to be conveyed is introduced. The section 22 has a substantially cylindrical end portion with a flange 24, and secured to this flange 24 by a similar flange 25 is a barrel section 26 which is made of upper and lower parts of arcuate section, each of which has longitudinal flanges by which the parts are secured together. Each part carries part of the flange 25 at one end and at the other end the section 26 is secured by a suitable flange to the flange 28 at the end of an offset discharge section 29. This section terminates in a flange 30 secured by means of a similar flange 31 to the transport line 32. This transport line leads to the different points to which the material is to be conveyed, and may extend for long distances.

Mounted in a suitable bearing 33 in the pillow block is the main drive shaft 34 which extends through a stuffing box 35 secured to one end of the section 22, the shaft passing through sections 22 and 26, which together form a casing for the shaft, and out through a tubular extension 36 from the wall of the discharge section 29. The end of the shaft passing through the extension 36 is supported in a suitable end bearing 37. The shaft carries flights 38 which together form a conveyor screw, and these flights are made up of subsections which are welded to each other and to the shaft to form a continuous screw. The flights are placed closer together on the shaft at the discharge end of the casing so that the pitch of the screw is reduced. Also, the terminal flights 39 and 40 are of increased thickness and preferably made of some material especially resistant to wear, as, for instance, chilled cast iron. In the operation of the mechanism, the material, as it is advanced through the casing, is subjected to increasing mechanical pressure, owing to the decrease in pitch of the flights of the screw, and this compacted material forms a seal for the air which is injected into the material to render it fluent, the seal preventing the air from passing backward through the screw casing. It has been found that the greatest wear on the flights of the screw occurs at the discharge end, where the material is compressed, and accordingly these flights are made of increased thickness, so as to be able to exert the desired mechanical pressure on the material without breakage and also to withstand the abrading action of the material.

Near the end of the section 26 is a ring 41 having a plurality of orifices 42 on its inner face. The ring is so placed that the material propelled through the section by the screw passes through the ring past the orifices and these orifices are supplied with air under pressure through a suitable channel 43 and an air supply line 44. The arrows in Fig. 1 indicate the direction in which the air enters the material and the air serves to render the compressed mass of material issuing from the section 26 more fluent. Air from the line 44 is likewise admitted into the bearing 37 at 45 and into the stuffing box 35, the air entering at these points also serving to prevent the ingress into the bearing and stuffing box, and in the case of the bearing, also aerating the discharging material.

The casing 26 through which the material is propelled by the conveyor screw is, as previously described, in upper and lower sections, and within this casing are liner members 46. Each liner member is of semi-circular cross-section, so that a pair of the members 46, when placed together, as shown in Fig. 4, form a cylindrical liner section 47. These liner sections are of less length than the casing section 26, and in the apparatus illustrated, two liner sections are placed within the casing section 26, the liner members lying in channels 48 in the upper and lower parts of the section 26. The liners are held in proper position by means of set screws 49 passing through the wall of section 26 and this section is also provided with eyes 50 by which the upper part of the section may be removed.

The liner members are designed to have great resistance to wear and these members may either be made of a metal which is extremely hard and wear-resistant, or else they may be of metal capable of being heat treated so that the faces 51 of the liner members may be given this hard and wear-resistant quality. Another method of making the liner members involves placing face plates of a hard material, such, for example, as the alloy known as stellite, on the inner faces of the bodies of the sections and welding these hard face plates to the bodies of the members. The liner members are carefully finished on both their inner and outer faces, and they are made of the same size and shape so that they are interchangeable one with another and also interchangeable with respect to their ends. As the wear to which the lining is subjected is greatest at the discharge end of the casing, after the apparatus has been in use for a while, the upper part of the section 26 is removed and the end liner members 52 are turned end for end, thus placing the unworn ends of the members at the point where the greatest wear occurs. After the members have again been subjected to wear for a period, the end section 52 may be replaced by the section 53, and after a still further period of wear, the members of the section 53 may be turned end for end, as previously mentioned. In this manner the liner members which are made of material which is unusually durable, are capable of being used to the fullest extent, and since the upper section of the casing 26 is readily removable the replacement of the liner members is a simple operation, since the lower members may be slipped out of position by a rotary movement with respect to the axis of the shaft.

I claim:

1. Apparatus for conveying pulverulent material which comprises the combination of a casing of cylindrical form having a discharge end, this casing having a circumferential channel in its inner wall terminating adjacent the discharge end of the casing and extending through the major portion of the length of the casing, a shaft extending through this casing, means carried by the shaft for propelling material through the casing, and a removable liner section lying in the channel in the casing and forming the major portion of the inner wall of the casing, the liner section having an inner diameter the same as that of the casing beyond said channel.

2. Apparatus for conveying pulverulent material which comprises the combination of a casing of cylindrical form having a discharge end having a circumferential channel in its inner face extending from the discharge end of the casing through the major portion of the length of the casing, a shaft extending through the casing, means carried by the shaft for propelling material through the casing, the said means exerting increasing pressure on the material as it is advanced toward the said discharge end, and a removable liner section lying in the channel in the casing and forming the major portion of the inner wall of the casing the said section having an inner diameter the same as that of the casing beyond said channel.

3. Apparatus for conveying pulverulent material which comprises the combination of a casing of cylindrical form having a discharge end having a circumferential channel in its inner face, a shaft extending through the casing, means carried by the shaft for propelling material through the casing, and a plurality of liner members lying in the channel in the casing adjacent the discharge end and together forming a liner section which serves as part of the inner wall of the casing, the inner diameter of the lining section so formed being the same as that of the casing beyond the channel.

4. Apparatus for conveying pulverulent material which comprises the combination of a casing of cylindrical form having a discharge end, this casing having a circumferential channel in its inner face extending through the major portion of the length of the casing, a shaft extending through this casing, a conveyor screw mounted on the shaft and operable to propel material through the casing, this screw being arranged to subject the material to increasing pressure as it advances toward the said discharge end, and a removable liner section lying in the channel in the casing adjacent the discharge end thereof and forming part of the inner wall of the casing, the section having an inner diameter the same as that of the casing.

5. Apparatus for conveying pulverulent material which comprises the combination of a casing of cylindrical form having a discharge end and a circumferential channel adjacent said end, a shaft extending through the casing, a conveyor screw mounted on the shaft and operable to propel material through the casing, the flights of this screw being of increasing thickness toward the discharge end of the casing and a removable liner section of wear-resistant material within the channel and forming a part of the inner wall of the casing, the section having an inner diameter the same as the inner diameter of the casing beyond the channel.

6. Apparatus for conveying pulverulent material which comprises the combination of a casing of cylindrical form having a discharge end and a circumferential channel adjacent said end, a shaft extending through this casing, a conveyor screw mounted on the shaft and operable to propel material through the casing, this screw being made up of flight sections secured together, the flights adjacent the discharge end of the casing gradually increasing in thickness, and a removable liner section within the channel, the inner diameter of the section being the same as the inner diameter of the casing, the section serving as the inner wall of the casing throughout the width of the channel.

7. Apparatus for conveying pulverulent material which comprises the combination of a casing of cylindrical form having a discharge end and made up of upper and lower parts secured together along their edges, these parts having channels in their inner faces, upper and lower liner members disposed within the channels and forming the inner wall of the casing adjacent the said discharge end, a shaft extending through the casing, and means on the shaft for advancing the material through the casing to the discharge end thereof.

8. Apparatus for conveying pulverulent material which comprises the combination of a casing of cylindrical form having a discharge end and made up of upper and lower parts having edge flanges, said flanges being secured together and the parts having channels in their inner faces, upper and lower liner members of arcuate section which together form a cylinder disposed in the channels in the parts of the casing adjacent the discharge end thereof and forming the inner wall of the casing, a shaft extending through the casing, and a screw mounted on the shaft and arranged for advancing the material through the casing.

9. In apparatus for conveying pulverulent material, the combination of a casing having a circumferential channel near one end thereof, a shaft within the casing, means on the shaft for propelling material through the casing toward the end at which said channel is located, and liner members within the channel, these members forming the inner wall of the casing throughout said channeled portion and being made of special wear-resistant material.

10. In apparatus for conveying pulverulent material, the combination of a casing of cylindrical form, made up of upper and lower members secured together along their edges, each of these members having a recess in its inner face extending through a portion of its length, a liner member of wear-resistant material removably mounted in each recess, these members together forming the inner wall of the casing, and means for advancing the material through the casing.

11. In apparatus for conveying pulverulent material, the combination of a cylindrical casing having a recess extending throughout a part of the length of its inner wall, a liner section disposed within the recess and forming the inner wall of the casing throughout the length of said recess, means projecting through the casing and engaging the liner section for holding the latter in place, and means for propelling material through the casing.

12. Apparatus for conveying pulverulent material, which comprises the combination of a casing of cylindrical form made up of upper and lower half sections provided with flanges extending longitudinally, each of these sections having a recess extending throughout a portion of the length of its inner face, means for connecting the flanges together, complementary liner members disposed within the recesses in the sections and forming the inner wall thereof throughout the extent of said recesses, a shaft extending through the casing and provided with means for propelling material therethrough, and means passing through the sections and engaging the liner members for holding the latter in position.

In testimony whereof I affix my signature.

ALONZO G. KINYON.